United States Patent Office 3,828,075
Patented Aug. 6, 1974

3,828,075
SYNTHESIS OF 1,5-DIMETHYL-6,8-DIOXABICYCLO[3.2.1]OCTANE
Hans K. Dietl, Kingsport, Tenn., assignor to Eastman Kodak Company, Rochester, N.Y.
No Drawing. Filed Aug. 8, 1972, Ser. No. 278,841
Int. Cl. C07d 13/04
U.S. Cl. 260—340.9                                                 3 Claims

ABSTRACT OF THE DISCLOSURE 1,5-Dimethyl-6,8-dioxabicyclo[3.2.1]octane is prepared by reacting 2-methyl-1-heptene-6-one with a peracid or peroxide.

---

This invention relates to the synthesis of 1,5-dimethyl-6,8-dioxabicyclo[3.2.1]octane and more particularly relates to the synthesis of this compound by the reaction of 2-methyl-1-heptene-6-one with a peracid or peroxide.

There are substances produced by insects themselves which are necessary to their reproduction and defense. For example, the female insect produces a natural attractant that elicits a sexual response in a male insect. Thus, such sex attractants have proved to be invaluable for the detection and estimation of insect populations. The insect, attracted to a trap, is caught thereby showing that a specific species is present in the area. This is due to the highly specific nature of the attractant since that which is attractive to one species of insect is not necessarily attractive to another.

If it is desired to destroy a particular species of an insect, the sex attractants will lure them into traps where they may be destroyed or exposed to a sterilant. If the males are destroyed the ability of the species to reproduce is severely limited. The same result is achieved when the males are sterilized and then released in that once a female has mated it will not mate again regardless of whether the original mate was sterile. As insects become more resistant to insecticides the use of an attractant becomes more and more important. The use of attractants provides a non-ecologically damaging method for eradicating insects.

It has been reported by Vite and Pitman [J. Econ. Estomol., 63, 1132 (1970)] that 1,5-dimethyl-6,8-dioxabicyclo[3.2.1]octane (frontalin) is a sex attractant for the southern pine beetle and other related beetles. Kinzer et al. in Nature, T21, 477 (1969) has reported the synthesis of this attractant by heating methyl vinyl ketone and methallyl alcohol while D'Silva has reported the synthesis of the attractant by heating a mixture of formaldehyde, acetone and methallyl alcohol in a 35% yield.

It has been found in accordance with one aspect of this invention that 1,5-dimethyl-6,8-dioxabicyclo[3.2.1]octane can be simply and easily prepared in high yield by oxidation of 2-methyl-1-heptene-6-one with a peracid or peroxide. The reaction is carried out under conditions which one would expect to produce an epoxidized compound. However, although the epoxide may exist at some time during this process it occurs so briefly that it cannot be readily identified. While the epoxide may exist as a reaction intermediate, it is quickly cyclized under the reaction conditions to the desired 1,5-dimethyl-6,8-dioxa- bicyclo[3.2.1]octane. This result is completely unexpected. The reaction probably proceeds as follows:

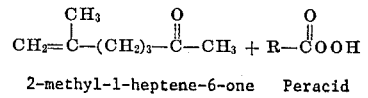

2-methyl-1-heptene-6-one    Peracid

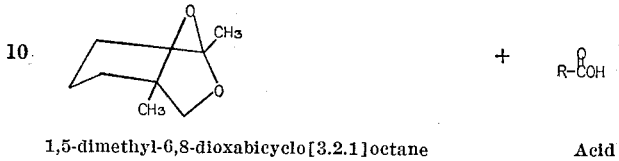

1,5-dimethyl-6,8-dioxabicyclo[3.2.1]octane              Acid

In the above reaction R is selected such that the peracid is one that is known to result in the epoxidation of carbon to carbon double bonds. These acids include perbenzoic, monoperphthalic, perpropionic, perbutyric, permonochloroacetic, peracetic, performic, perisovaleric, percrotonic, diperoxalic, percamphoric, trifluoroperacetic, p-nitroperbenzoic, m-chloroperbenzoic acids and the like.

The process for producing the desired compound according to this aspect of the invention includes the step of dissolving 2-methyl-1-heptene-6-one in a suitable solvent such as methylene chloride or other solvent which will not react under the reaction conditions with the peracid or the desired product. Examples of such include chloroform, carbon tetrachloride, acetic acid and the like. A neutralizer such as sodium acetate, potassium acetate, or lithium acetate may be present although it is not necessary under most conditions.

A peracid which may contain a neutralizer is added to the solution with stirring at a temperature of from about −30 to 150° C. At very low reaction temperatures the stirring must be continued for a considerable period of time, i.e., up to about 100 hours. If the reaction temperature is on the high end of the range the desired product is formed as rapidly as the peracid is added to the solution. It is preferred that the reaction be carried out under fairly mild conditions, i.e., room temperature with a reaction time of from 2 to 10 hours. The controlling factor is that the reaction be complete and the desired end product formed.

The reaction mixture is then poured into water and the organic layer is separated. Upon distillation this layer gives 1,5-dimethyl-6,8-dioxabicyclo[3.2.1]octane having a boiling point of 77 to 85° C. at 50 mm. mercury. The yield of this reaction is about 95%.

In accordance with another aspect of the invention 1,5-dimethyl-6,8-dioxabicyclo[3.2.1]octane is product by reacting 2-methyl-1-heptene-6-one with a peroxide such as hydrogen peroxide. For example, this process includes dissolving 2-methyl-1-heptene-6-one in a stirred mixture of methylene chloride or other suitable solvent as listed above, hydrogen peroxide, and maleic anhydride. The reaction mixture is maintained at a temperature of about 0 to 30° C. for about 4 hours while stirring is continued. After filtration and distillation 1,5-dimethyl-6,8-dioxabicyclo[3.2.1]octane is obtained at 66 to 78° C. at 30 mm. of mercury. The yield is about 91%. The preferred peroxide utilized in this process is hydrogen peroxide. Other than maleic anhydride, any other acid or anhydride can be utilized in the process. For example, acetic acid has been found to be suitable.

The reaction conditions under which the process is carried out are those known to epoxidize C=C. The reaction is believed to proceed as follows:

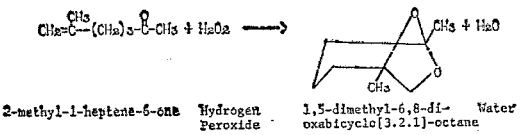

2-methyl-1-heptene-6-one   Hydrogen Peroxide   1,5-dimethyl-6,8-dioxabicyclo[3.2.1]-octane   Water Under the reaction conditions described above in regard to the peracid and peroxide one would expect to obtain the epoxide having the following structural formula

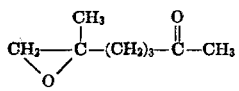

It is well documented that under the conditions and with the reactants described above, one would expect to obtain an epoxy compound. See, for example, Weissberger, *Heterocyclic Compounds*, Part I (New York, 1964), pp. 31–93. It is entirely unexpected that the bicyclic compound 1,5-dimethyl-6,8-dioxabicyclo[3.2.1]octane is obtained instead.

Accordingly, it is an object of this invention to synthesize the compound 1,5-dimethyl-6,8-dioxabicyclo[3.2.1]octane utilizing as a starting material 2-methyl-1-heptene-6-one and utilizing reactants and reacting conditions which one would believe would result in an epoxide.

Another object of the invention is to produce 1,5-dimethyl-6,8-dioxabicyclo[3.2.1]octane in a high yield and in a single step from a readily available starting material.

The following examples are presented for further understanding of the invention.

EXAMPLE 1

2-Methyl-1-heptene-6-one (126 g., 80% purity) is dissolved in 1000 ml. methylene chloride. Sodium acetate (10 g.) is added and the mixture is cooled to 0° C. Peracetic acid (40%, 190 g.) containing sodium acetate (10 g.) is added with stirring at 0° C. over a period of 1 hour. The reaction mixture is allowed to warm to room temperature, stirred overnight, and then poured into water. The organic layer is separated, dried over MgSO₄ and filtered. Distillation yields 1,5-dimethyl-6,8-dioxabicyclo[3.2.1]octane (106 g., 95% yield), boiling point 77–85° C. at 10 mm. of mercury.

EXAMPLE 2

The exact procedure of Example 1 is repeated except 1 mole of m-chloroperbenzoic acid per mole of 2-methyl-1-heptene-6-one is used instead of peracetic acid and no sodium acetate is used. The yield is 95%.

EXAMPLE 3

2-Methyl-1-heptene-6-one (15 g., 80% purity) is added at 0° C. to a stirred mixture of methylene chloride (120 ml.), hydrogen peroxide (10.8 g., 50%) and maleic anhydride (23.55 g.). Stirring is continued at 0° C. for four hours. A precipitate is formed (maleic acid) which is filtered off. The filtrate is washed with 10% NaHCO₃ solution (150 ml.), then with 10% NaHSO₃ solution (150 ml.) and finally with water (150 ml.) and dried over MgSO₄. After filtration the product mixture is distilled under reduced pressure (3 mm. mercury). 1,5-Dimethyl-6,8-dioxabicyclo[3.2.1]octane (11.8 g.) is obtained at 66–78° C. at 3 mm. mercury. Yield is 88%.

A new one-step process for producing the bicyclic compound 1,5-dimethyl-6,8-dioxabicyclo[3.2.1]octane which is a sex attractant of the southern pine beetle and related beetles has been disclosed. In comparison with previously used processes, the processes is simple and produces the compound at a high yield.

Although the invention has been described in considerable detail with particular reference to certain preferred embodiments thereof, variations and modifications may be effected within the spirit and scope of the invention.

I claim:

1. Method of preparation of 1,5-dimethyl-6,8-dioxabicyclo[3.2.1]octane comprising the step of reactng a solution of 2-methyl-1-heptene-6-one dissolved in a solvent selected from methylene chloride, chloroform, carbon tetrachloride, or acetic acid, with a peracid or peroxide selected from perbenzoic acid, monoperphthalic, perpropionic acid, perbutyric acid, permonochloroacetic acid, peracetic acid, performic acid, perisovaleric acid, percrotonic acid, diperoxalic acid, percamphoric acid, trifluoroperacetic acid, p-nitroperbenzoic acid, m-chloroperbenzoic acid, or hydrogen peroxide, at a temperature of about 0° to 30° for about 2 to about 10 hours.

2. Method of preparation according to Claim 1 wherein the peroxide is hydrogen peroxide.

3. Method of preparation according to Claim 1 wherein the peracid is peracetic acid.

References Cited

UNITED STATES PATENTS 3,755,365   8/1973   Fentiman _____ 260—340.9

DONALD G. DAUS, Primary Examiner

J. H. TURNIPSEED, Assistant Examiner

U.S. Cl. X.R.

424—84, 278